(12) United States Patent
Miyazaki et al.

(10) Patent No.: US 7,519,992 B2
(45) Date of Patent: Apr. 14, 2009

(54) ACCESS CONTROL SYSTEM, DEVICE, AND PROGRAM

(75) Inventors: Shingo Miyazaki, Yokohama (JP); Takehisa Kato, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 838 days.

(21) Appl. No.: 10/445,911

(22) Filed: May 28, 2003

(65) Prior Publication Data

US 2004/0073814 A1     Apr. 15, 2004

(30) Foreign Application Priority Data

| May 30, 2002 | (JP) | ............................. 2002-158028 |
| May 20, 2003 | (JP) | ............................. 2003-141996 |

(51) Int. Cl.

| G06F 7/04 | (2006.01) |
| G06F 7/58 | (2006.01) |
| G06F 12/00 | (2006.01) |
| G06F 12/14 | (2006.01) |
| G06F 13/00 | (2006.01) |
| G06F 17/30 | (2006.01) |
| G06K 19/00 | (2006.01) |
| H04L 9/32 | (2006.01) |

(52) U.S. Cl. ...................................................... 726/21

(58) Field of Classification Search ........................ None
See application file for complete search history.

(56) References Cited

U.S. PATENT DOCUMENTS

| 7,036,146 B1 * | 4/2006 | Goldsmith .................... 726/21 |
| 7,117,368 B2 * | 10/2006 | Sako .......................... 713/180 |
| 2002/0147929 A1 * | 10/2002 | Rose .......................... 713/201 |
| 2004/0073814 A1 | 4/2004 | Miyazaki et al. |

OTHER PUBLICATIONS

G. Ateniese, et al., Lecture Notes in Computer Science 1880, Advances in Cryptology—CRYPTO 2000, pp. 255-270, "A Practical and Provably Secure Coalition-Resistant Group Signature Scheme", Aug. 2000.

J. Camenisch, et al., CRYPTO '97, LNCS 1296, pp. 410-424, "Efficient Group Signature Schemes for Large Groups", 1997.

(Continued)

*Primary Examiner*—Minh Dieu Nguyen
*Assistant Examiner*—Nadia Khoshnoodi
(74) *Attorney, Agent, or Firm*—Oblon, Spivak, Maier & Neustadt, P.C.

(57) ABSTRACT

A group administration organization device admits a user device to an authorized group by request and sends authority permission information to the user device. The user device holds the authority permission information received from the group administration organization device and, on access, sends authority proof information created from the authority permission information using a group signature scheme to a service provider device as requested by it. The service provider device, upon being accessed, requests the authority proof information and verifies the authority proof information received from the user device in accordance with the request on the basis of the group signature scheme. When the verification result indicates validity, the service provider device provides a service. Thus, there is no need for the service provider to manage personal information of the user because the user device proves to the service provider device using the group signature scheme that it belongs to the authorized group.

3 Claims, 8 Drawing Sheets

OTHER PUBLICATIONS

J. Camenisch, et al., Technical Report No. 260, pp. 1-13, "Proof Systems for General Statements About Discrete Logarithms", Mar. 1997.

J. Camenisch, et al., Lecture Notes in Computer Security, vol. 5, No. 1, pp. 1-22, "Digital Payment Systems With Passive Anonymity-Revoking Trustees", May 11-15, 1997.

J. Camenisch, EUROCRYPT '97, vol. 1233 of LNCS, pp. 465-479, "Efficient and Generalized Group Signatures", 1997.

Giuseppe Ateniese, et al., "A Practical and Provably Secure Coalition-Resistant Group Signature Scheme", CRYPTO 2000, LNCS 1880, (-16- pages).

Jan Camenisch, et al., "Efficient Group Signature Schemes for Large Groups", Advances in Cryptology, CRYPTO '97, vol. 1296 of LNCS, (-15- pages).

Jan Camenisch, et al., "Proof Systems for General Statements About Discrete Logarithms", Technical Report No. 260, Dept. of Computer Science, ETH Zurich, Mar. 1997, pp. 1-13.

Jan Camenisch, et al., "Digital Payment Systems With Passive Anonymity-Revoking Trustees", Journal of Computer Security, IOS Press., vol. 5, No. 1, 1997, pp. 1-22.

Jan Camenisch, "Efficient and Generalized Group Signatures", Advances in Cryptology, EUROCRYPT '97, vol. 1233 of LNCS, Springer-Verlag, 1997, (-14- pages).

U.S. Appl. No. 11/963,138, filed Dec. 21, 2007, Yoshida et al.

* cited by examiner

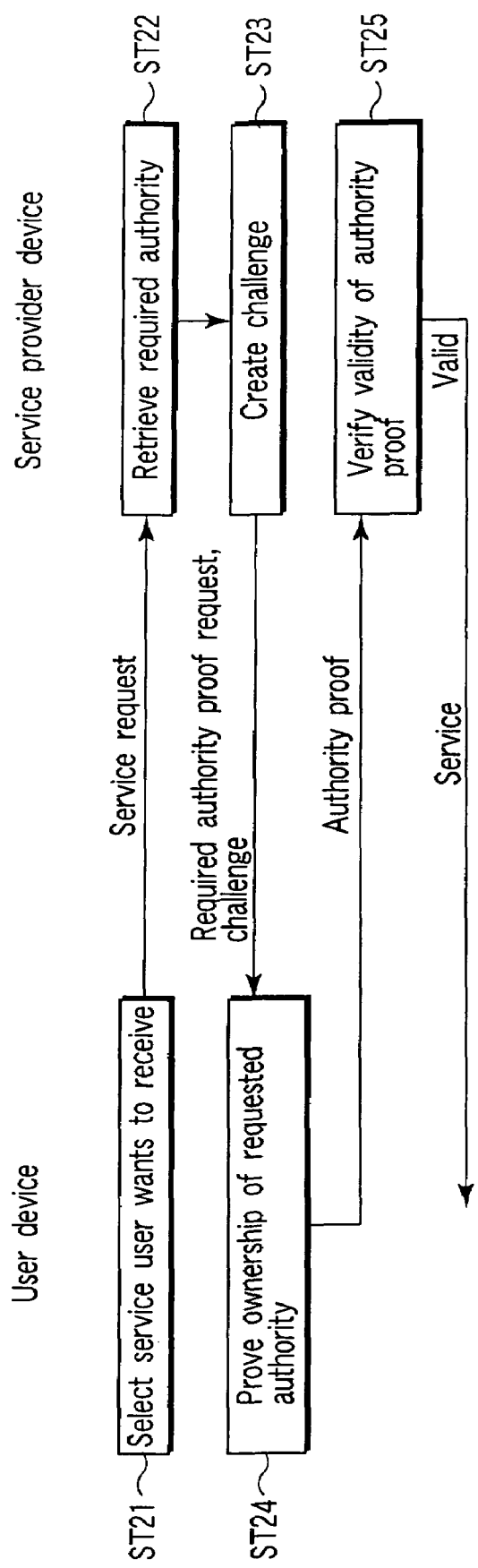
F I G. 3

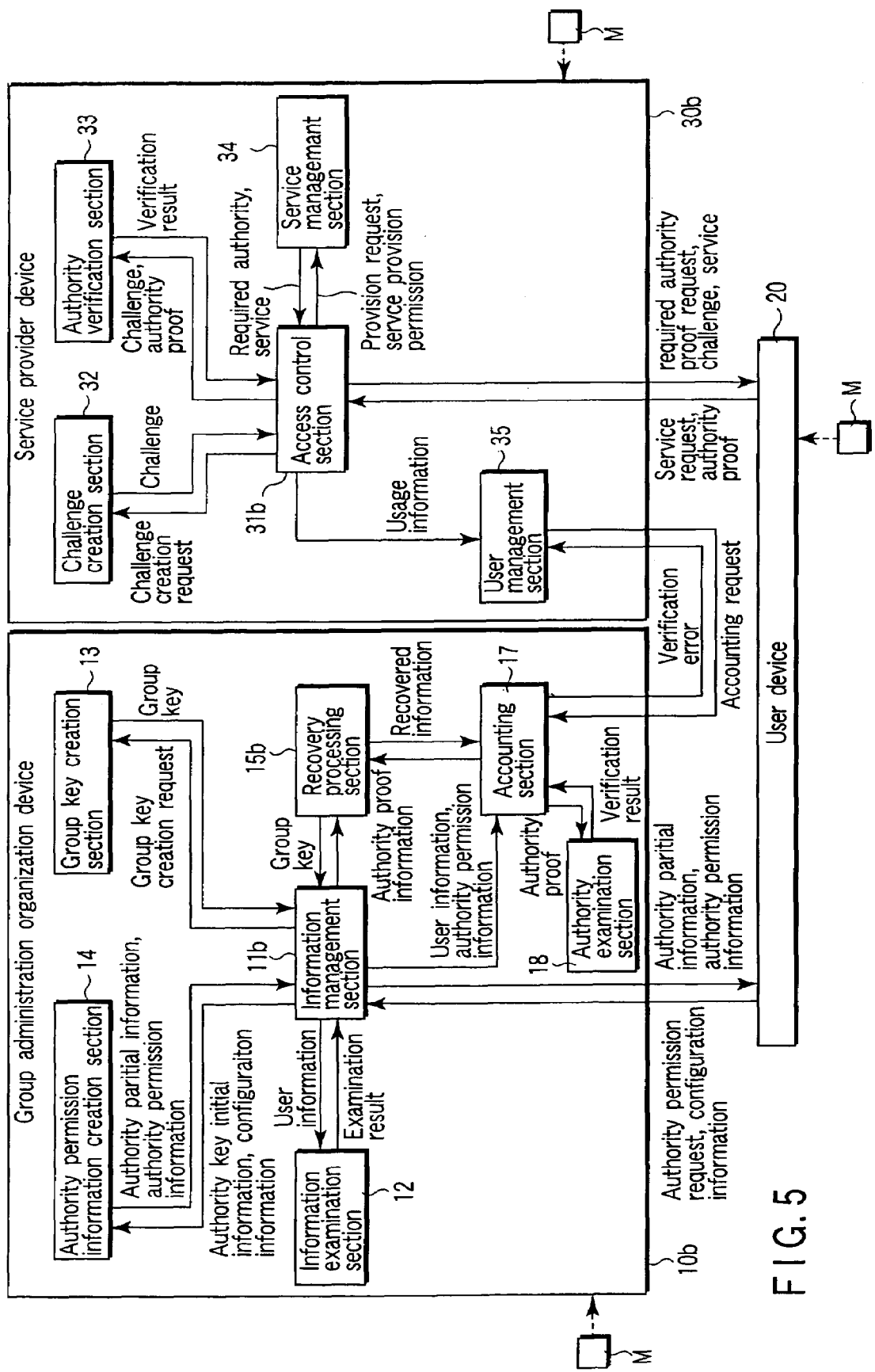
F I G. 5

|  | One service provider device 30 |  |  |
|---|---|---|---|
|  | Service |  |  |
|  | Class CL1 | Class CL2 | Class CL3 |
| Group G1 | ○ | — | — |
| Group G2 | ○ | ○ | — |
| Group G3 | ○ | ○ | ○ |

FIG. 8

|  | Domain #1 | Domain #2 |
|---|---|---|
|  | Devices 30 A,B,C | Devices 30 D,E |
| Group X | ○ | — |
| Group Y | — | ○ |
| Group Z | ○ | ○ |

FIG. 9

ACCESS CONTROL SYSTEM, DEVICE, AND PROGRAM

CROSS-REFERENCE TO THE RELATED APPLICATIONS

This application is based upon and claims the benefit of priority from the prior Japanese Patent Applications No. 2002-158028, filed on May 30, 2002; and No. 2003-141996, May 20, 2003 the entire contents of which are incorporated herein by reference.

BACKGROUND OF THE INVENTION

The present invention relates to an access control system, device, and program which are based on the ownership of authority and applicable to various services.

In the field of service provision over electronic networks, an access control system is known in which a service provider determines whether or not unspecified people who request access have authority to receive services and grants access to only the people who have authority.

Access control systems of this type include (a) systems which use IDs and passwords and (b) systems which use public key certificates.

(a) In the system in which IDs and passwords are used, a service provider issues an ID and a password to a user at the time of registration of that user and, when a request is made for a service, verifies the ID and the password of the service requesting person.

(b) In the system in which public key certificates are used, a public key certificate that assures the validity of a public key and the public key are handled as unique information to identify a user. This system has an advantage of being easily associated with other transactions (transactions, processes) because no user ID is used.

The access control system is used in others than such electronic networks as described above.

(c) For example, some automatic vending machines that vend alcoholic drinks and cigarettes are equipped with an access control system which, in order to prevent vending to minors, reads the dates of birth described on licenses to verify the age.

However, the access control systems as described above have the following disadvantages (a')-(c'):

(a') With the system (a), it is required that the service provider strictly manage information about individual persons and a list of IDs and passwords; thus, a high cost will be incurred.

(b') With the system (b), unique information to the user, such as a public key and a public key certificate, is given to the service provider. The unique information cannot be concealed even through an anonymous network.

The system (b) is equivalent to the case where the user ID is replaced with pseudonym information. For this reason, the possibility of outflow of personal information will increase at a stage in which the personal information and the pseudonym information are disclosed together. In addition, the service provider will have to bear a high cost in strictly managing information in which the public keys of users are associated with their respective service usage information.

Here, the costs in (a') and (b') are expected to increase with increasing tendency to legal protection of personal information of users, such as the legislation of a personal information protection law, the establishment of privacy marks, etc.

In addition to this, with the systems (a) and (b), personal information employment systems and their actual results can cause a risk of affecting the relationships with users and other business partners.

For example, if personal information were not managed strictly, there would arise the possibility of leakage of information like a case of leakage of accounting information such as credit card numbers. This type of information leakage would cause damage to users, cause the service provider to suffer a loss in credit of its brand, and lose the credit with other business partners.

However, with a service provider which provides electronic contents in particular, since it consists usually of a small number of employees, trying to establish an employment system which strictly manages personal information to achieve satisfactory results would make the workload on the employees and the cost burden too heavy.

(c') The system (c) adapted to read licenses would cause the users to be afraid that personal information other than age might be read from the licenses and bring to the vendors the cost of guaranteeing not to read personal information other than ages.

BRIEF SUMMARY OF THE INVENTION

It is an object of the present invention to provide an access control system, device, and program which allow service providers to be relieved of the burden of managing personal information.

It is another object of the present invention to provide an access control system, device, and program which allow personal information unnecessary for proof of authority to be protected from service providers.

According to a first aspect of the present invention there is provided an access control system which controls access by a user device to a service provider device on the basis of a group signature scheme for proving that a user belongs to an authorized group without identifying the user, comprising: a group administration organization device which, at a user's request, admits the user device to the authorized group, creates authority permission information using the group signature scheme, and sends the authority permission information to the user device; the user device which retains the authority permission information received from the group administration organization device as the result of the user's request, and, in response to a request made by the service provider device on access to the service provider device, creates authority proof information using the group signature scheme from the authority permission information and sends the authority proof information to the service provider device; and the service provider device which, when accessed by the user device, requests authority proof information of the user device, verifies the authority proof information received from the user device through the group signature scheme and, when the verification result indicates validity, provides a corresponding service.

Thus, there is no need for the service provider to manage personal information of users because the fact that a user device is a member of an authorized group is proved to the service provider device using the group signature. Therefore, the service provider can be relieved of the burden of managing personal information and personal information unnecessary to prove authority can be protected from the service provider.

BRIEF DESCRIPTION OF THE SEVERAL VIEWS OF DRAWING

FIG. 3 is a flowchart illustrating the operation of the first embodiment;

FIG. 5 is a schematic illustration of an access control system according to a third embodiment of the present invention;

FIG. 8 is a schematic illustration for use in explanation of the definition of groups applied to an access control system according to a fifth embodiment of the present invention; and FIG. 9 is a schematic illustration for use in explanation of the definition of groups applied to an access control system according to a sixth embodiment of the present invention.

DETAILED DESCRIPTION OF THE INVENTION

Figure 1:
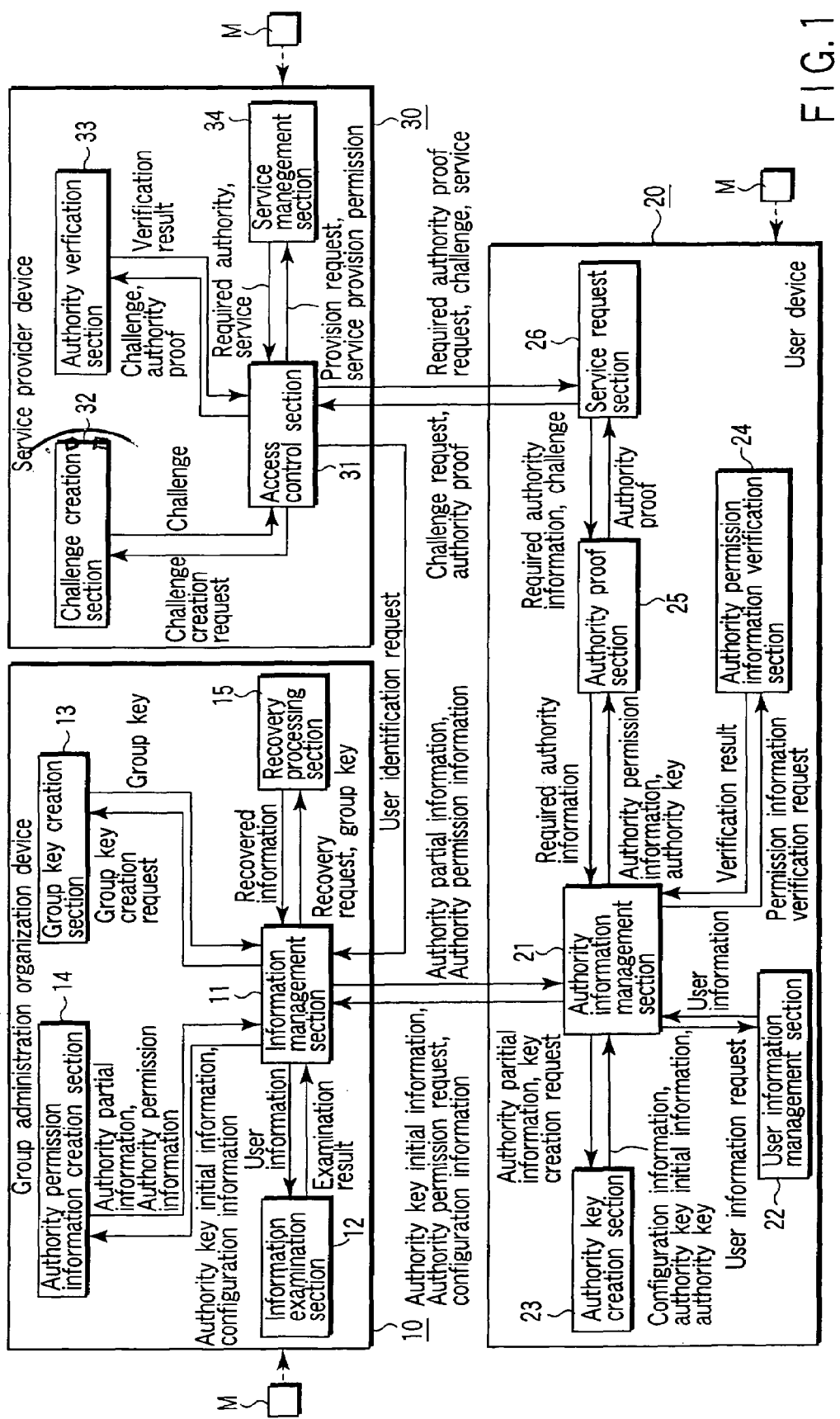
FIG. 1 is a schematic illustration of an access control system according to a first embodiment of the present invention.

The embodiments of the present invention will be described hereinafter with reference to the accompanying drawings.

Before describing the embodiments, a group signature scheme will be described which is the key technology in each of the embodiments.

The group signature scheme, which is one type of digital signature, is a technique to prove the validity of a signature without showing the unique information of a signer to a person who verifies the signature. Specifically, the group signature scheme is a technique which, for a group comprised of signers each having a different signature key, identifies the group to which a signer belongs on the basis of a group signature made by an arbitrary signature key in the group without identifying the signer. The person who can identify the signer from the group signature is only the group administrator. This type of group signature and electronic payment technology is described, for example, in the following literature (1) to (5):

(1) G. Ateniese, J. Camenisch, M. Joye and G. Tsudik. A practical and provably secure coalition-resistant group signature scheme. CRYPTO 2000, LNCS 1880, pp. 255-270, Springer-Verlag, 2000.

(2) J. Camenisch and M. Stadler. Efficient group signature schemes for large groups. In Advances in Cryptology—CRYPTO '97, Vol. 1296 of LNCS, pp. 410-424, Springer-Verlag, 1997.

(3) J. Camenisch and M. Stadler. Proof systems for general statements about discrete logarithms. Technical Report TR 260, Institute for Theoretical Computer Science, ETH Zurich, March 1997.

(4) J. Camenisch, U. Maurer and M. Stadler. Digital Payment Systems with Passive Anonymity-Revoking Trustees. In Journal of Computer Security, vol. 5, No. 1, CIOS Press, 1997.

(5) J. Camenisch. Efficient and Generalized Group Signature. In Advances in Cryptology—EUROCRYPTO '97, Vol. 1233 of LNCS, pp. 465-479, Springer-Verlag, 1997.

Here, a group signature scheme by J. Camenisch et al which is similar to the group signature schemes described in the above literature (1), (2) and (5) will be described as a typical example.

Here, the following Table 1 shows symbols in the group signature scheme by J. Camenisch et al and representations thereof.

TABLE 1

| Symbol | Representation |
| --- | --- |
| S | Signer |
| GA | Group Administrator |
| V | Verifier |
| p, q | High prime numbers which are known by only GA |
| $\lambda(n)$ | Lowest common multiple of p-1 and q-1 |
| n | Public key of GA, n = p q |
| L | Prime number such that n | (L − 1) |
| e | Public key of GA |
| d | Private key of GA, e d = 1 mod $\lambda$ (n) |
| a | Element having order $\lambda$ (n) in multiplicative group $Z_n^*$ |
| g | Element having order n in multiplicative group $Z_L^*$ |
| x | Private key of S |
| $\mu$ | Positive number to satisfy $2^\mu - 1 < \lambda$ (n) |
| y | Public key of S, y = $a^x$ |
| h( ) | One-way hash function |
| t, u, w | Random numbers |
| k | Security parameter in zero knowledge proof |

(Cam. 1: Preparation)

The group administrator GA makes open the element a, the public keys e, n, the prime L, and the element g. The signer S selects the private key x∈{1, . . . , 2μ−1} and creates the public key y=$a^x$ mod n.

(Cam. 2: Request for Admission to the Group)

The signer S selects the random number t∈{1, . . . , 2μ−1} and calculates knowledge proof SK(y) of the private key x for the public key y. The knowledge proof SK(y) is a set of $C_1$ and $S_1$ which are given by $$c_1 = h(y\|a\|a^t) \pmod{n}$$

$$s_1 = t - xc_1$$

The signer S then sends the public key y and the knowledge proof SK(y) to the group administrator GA.

(Cam. 3: Issue of a Certificate of Admission to the Group)

The group administrator GA calculates $S_1' = S_1 \pmod{\lambda(n)}$ and verifies that the signer S is keeping the correct private key x, in accordance with the following equation:

$$C_1 = h(y\|a\|y^{c_1}a^{s_1'}) \pmod{n}$$

After that, the group administrator GA confirms the authority of the signer S to join the group in accordance with an appropriate method.

Subsequent to this, the group administrator GA puts his or her signature to y+δ as indicated by the following equation, then issues an admission certificate v and sends it to the signer S in secret.

$$v=(y+\delta)^d \pmod{n}$$

Note that δ is, for example, unity.

(Cam. 4: Group Signature)

The signer S selects k random numbers $u_i \in \{1, \ldots, 2\mu-1\}$ that satisfy uj>x and determines $z=g^y \pmod{L}$. After that, the signer S determines the knowledge proof $SK2(m)=(C_2, S_{2,1}, \ldots, S_{2,k})$ of the private key x in accordance with the following equations:

$$c_2 = h(m\|z\|g\|g^{a^{u_1}}\| \ldots \|g^{a^{u_k}}) \pmod{L}$$

$$s_{2,i}=u_i-x \ldots \text{(if } c_2(i)=0\text{)}$$

$$s_{2,i}=U_i \ldots \text{(otherwise)}$$

where i=1, . . . , k.

Here, $c_2(i)$ refers to the i-th bit (i=1, . . . , k) from the binary high-order bit of $c_2$.

The signer S selects random numbers $w_i \in Z_n^*$ and determines the knowledge proof $SK3(m)=(C_3, S_{3,1}, \ldots, S3,k)$ of the admission certificate v as follows:

$$c_3 = h(m\|z\|g\|g^{w_1 e}\| \ldots \|g^{w_k e}) \pmod{L}$$

$$s_{3,j}=w^j/v \ldots \text{(if } c_3(j)=0\text{)}$$

$$s_{3,j}=w_j \ldots \text{(otherwise)}$$

where j=1, . . . , k.

In the final analysis, the signatures for m are SK2(m) and SK3(m).

(Cam. 5: Group Signature Verification)

The verifier V verifies the validity of the signer S using z in the following manner and, if correct, accepts m.

Verification of SK2 (proof of having the correct private key x):

$$c2 = h(m\|z\|g\|g^{a^{u_1}}\| \ldots \|g^{a^{u_k}}) \pmod{L}$$

$$g^{a^i} = z^{a^s} 2,i \pmod{L} \ldots \text{(if } c_2(i)=0\text{)}$$

$$g^{a^i} = g^{a^s} 2,i \pmod{L} \ldots \text{(otherwise)}$$

where i=1, . . . , k.

Verification of SK3 (proof of having the correct group admission certificate v)

$$c_3 = h(m\|z\|g\|g^{w_1 e}\| \ldots \|g^{w_k e}) \pmod{L}$$

$$g^{w^j e} = (zg)^{s^e} 3,j \pmod{L} \ldots \text{(if } c_3(j)=0\text{)}$$

$$g^{w^j e} = g^{s^e} 3,j \pmod{L} \ldots \text{(otherwise)}$$

where j=1, . . . , k.

The Camenisch's group signature scheme as described above creates SK2(m) using the private key x associated with the group admission certificate v and hence realizes non-repudiation. Also, that the signer S keeps the group admission certificate v is verified using the group public key e through verification of SK3(m); thus, verifiability is exhibited.

Furthermore, the verifier V uses the zero knowledge proof for verification, preventing the personal information of the signer S from leaking out and allowing anonymity to be preserved. In addition, since z in the signature of the signer S is produced from the only private key x, the use of the same base gallows user information to be linked between sessions. Thus, the use of different bases will satisfy intraceability.

The above is the Camenisch's group signature scheme. Other group signature schemes have similar properties.

The embodiments use such group signature schemes as the authentication technology. A service provider makes a decision of whether or not a signer belongs to a group authorized to access services without specifying each individual signer and performs control of access to services according to the result of decision.

Thereby, the service provider is allowed to omit the effort to manage personal information of signers (hereinafter referred to as users as well) and to determine whether or not users have authority to receive services.

The users have an advantage that they can receive services without showing their personal information to the service provider. The service provider has an advantage of being able to provide services without receiving personal information that involves cost and risk.

In addition, the configuration of an anonymous network for communications from users to the service provider allows the buildup of a scheme of strong zero knowledge proof which does not disclose anonymous and user-specific information at all. It does not matter whether users are not only individuals but also countries, businesses, organizations, computers, devices, etc.

Information or authority that is proved through a group signature is part of previously entered personal information (hereinafter referred to as user information as well) of a user and can set various contents. Contents that can be set include natural information about a user, such as name, age, sex, legal domicile, etc., and social or ability attribute information, such as state qualifications, organizations to which the user belongs, positions in the organizations (managerial positions or status), student, etc.

Next, each of the embodiments of the access control system using the technology of the group signature scheme as described above will be described.

FIRST EMBODIMENT

FIG. 1 is a schematic representation of an access control system according to a first embodiment of the present invention. In this access control system, one or more group administration organization devices 10, two or more user devices 20, and one or more service provider devices 30 are interconnected by a public network, such as the Internet, so that they can communicate with one another. In FIG. 1, each of these devices 10, 20 and 30 is typified by only one device. The network is not. limited to a public communications system. Dedicated circuits or radio communications among devices may be used or they may be used in combination.

Here, each of the devices 10-30 can be implemented by hardware only or a combination of hardware and software. If each of the devices 10-30 includes a software configuration, its software-based portion is implemented by installing a program for performing corresponding functions into its computer from a storage medium M or the network in advance. This is the case with each device in the following embodiments.

Next, the configuration of each of the devices 10-30 will be described in detail.

The group administration organization device 10 has an information management section 11, an information examination section 12, a group key creation section 13, an authority permission information creation section 14, and a recovery processing section 15.

The information management section 10 has not only an information management function (f11a) which is performed within it but also information management functions (f11b)-(f11e) including communications with the other sections 12-15.

The information management function (f11a) has a function of supporting the creation of definitions of groups which are allowed to use services on the basis of an operation by the administrator and a function of managing group user information, authority permission information, and permission information issue information.

The information management function (f11b) has a function of sending a request for group key creation to the group key creation section 13 for each group definition and a function of managing group keys received from the group key creation section 13 and the definition of the corresponding group in such a way that they are made to correspond with each other.

Here, the group keys are a private key possessed by the group administration organization device 10 alone and a public key used for each device to verify information about the group. The public key is required to create an authority key, to verify authority permission information for the authority key, to verify the validity of authority proof of whether or not a user is a member of the group, etc.

The information management function (f11c) has a function of, upon receipt of a request for authority permission information issued from the user device 20, sending user information and an examination request from the user device 20 to the information examination section 12 and a function of deciding the contents of the results of examination (either being eligible or ineligible) from the information examination section 12.

The information management function (f11d) has the following functions (f11d-1)-(f11d-3):
(f11d-1) The function of, when the examination result from the information examination section 12 indicates eligibility, sending authority key initial information in the authority permission information issue request to the authority permission information creation section 14.
(f11d-2) The function of sending authority key configuration information sent from the user device 20 to the authority permission information creation section 14 after verification.
(f11d-3) The function of sending authority partial information or authority permission information received from the authority permission information creation section 14 to the user device 20.

The information management function (f11e) has the following functions (f11e-1) and (f11e-2):
(f11e-1) The function of sending usage information, such as group key information and authority proof information, and a user recovery request to the recovery processing section 15 on the basis of a request for user identification and the history of service usage received from the service provider device 30.
(f11e-2) The function of identifying the corresponding user information on the basis of recovered information received from the recovery processing section 15.

Here, the user identification request includes information when the user gave the proof of authority to the service provider. A person who is allowed to send a user identification request may be not only a service provider but also a legal organization, such as a police station, a court, or the like. As an example of a legal organization sending a user identification request, the legal organization may acquire related information from a service provider as an investigation necessary for criminal investigation or judgment and make a request to chase the user.

The information examination section 12 has a function of, upon receipt of user information and an examination request from the information management section 11, verifying the validity of the user information and examining whether to allow the user to join a requested group or not and a function of sending the result of examination to the information management section 11.

Here, as the method of examination by the information examination section 12, there is available a method to access an information source (not shown) which previously manages the user versus the group relationship for verification, a method to directly contact the user for examination, or the like. For example, the examination method to directly contact the user involves causing the user to make a response to an inquiry displayed on the screen by the information examination section 12 and examining the contents of the response.

The authority permission information creation section 14 has information creation functions (f14a)-(f14c).

The information creation function (f14a) is a function of verifying the validity of authority key initial information received from the information management section 11, creating authority partial information when the verification result indicates validity, and sending it to the information management section 11.

The information creation function (f14b) is a function of verifying the validity of authority key configuration information received from the information management section 11, creating authority permission information when the verification result indicates validity, and sending the obtained authority permission information and permission information issue information, such as the date of issue of that information, the issue ID, etc., to the information management section 11.

Here, the authority permission information is information to the effect that the group administration organization device 10 has approved that the user device 20 is a member of the specified group.

The information creation function (f11c) is a function of notifying the information management section 11 of an error when the result of verification of the authority key initial information or the verification configuration information indicates invalidity.

The group key creation section 13 has a function of creating a group key in response to a request for group key creation received from the information management section 11 and sending the resulting group key to the information management section 11.

The recovery processing section 15 has a function of restoring user identification information on the basis of usage information and a user recovery request received from the information management section 11 and a function of sending the resulting recovered information to the information management section 11.

Meanwhile, the user device 20 has an authority information management section 21, a user information management section 22, an authority key creation section 23, an authority permission information verification section 24, an authority proof section 25, and a service requesting section 26.

The authority information management section 21 has authority information management functions (f21a)-(f21d) including communications with the other sections 22-25.

The authority information management function (f21a) has the following functions (f21a-1) and (f21a-2):
(f21a-1) The function of, when the user becomes a member of a group, sending a request for user information to the user information management section 22 and a request for authority key creation to the authority key creation section 23.

(f21a-2) The function of sending the user information received from the user information management section 22, the authority key initial information received from the authority key creation section 23, and a selected group authority permission information issue request to the group administration organization device 10.

The authority information management function (f21b) has a function of sending authority partial information received from the group administration organization device 10 to the authority key creation section 23 and authority key configuration information received from the authority key creation section 23 to the group administration organization device 10.

The authority information management function (f21c) has the following functions (f21c-1)-(f21c-3):

(f21c-1) The function of passing authority permission information received from the group administration organization device 10 and an authority key received from the authority key creation section 23 to the authority permission information verification section 24 to make a request to verify the validity of the authority permission information.

(f21c-2) The function of, when the result of that verification indicates validity, preserving and managing the selected group, the authority key, and the authority permission information in such a way as to associate them with one another.

(f21c-3) The function of, when the result of the verification indicates invalidity, notifying the group administration organization device 10 of an error.

The authority information management function (f21d) has a function of sending authority permission information and an authority key to the authority proof section 25 on the basis of a required authority information request received from the authority proof section 25.

The user information management section 22 has a function of managing user information in a readable/writable manner and a function of sending the user information of a specified user to the authority information management section 21 on the basis of a user information request received from the authority information management section 21.

The authority key creation section 23 has the following functions (f23-1)-(f23-3):

(f23-1) The function of creating authority key initial information in response to an authority key creation request received from the authority information management section 21.

(f23-2) The function of creating an authority key and authority key configuration information on the basis of authority partial information received from the authority information management section 21.

(f23-3) The function of sending the authority key initial information, the authority key and the authority key configuration information to the authority information management section 21.

Here, the authority key initial information is initial information that constitutes an authority key which is part of information which proves authority to access services. Examples of authority key initial information include information indicating authority key creating algorithms (for example, pseudo random number creating schemes and/or prime decision schemes) and information indicating their specifications (for example, the probability of failure when the prime decision schemes are stochastic ones).

The authority key configuration information includes information which proves that the authority key has been created validly on the basis of the authority partial information.

The authority permission information verification section 24 has a function of verifying the validity of authority permission information on the basis of authority permission information, an authority key and a validity verification request received from the authority information management section 21 and a function of sending the result of that verification to the authority information management section 21.

The authority proof section 25 has a function of sending a required authority information request to the authority information management section 21 in response to required authority information received from the service requesting section 26 and a function of proving the authority of challenge information received from the service requesting section 26.

The service requesting section 26 has the following functions (f26-1)-(f26-4):

(f26-1) The function of sending a service request to the service provider device 30.

(f26-2) The function of sending challenge information received from the service provider device 30 to the authority proof section 25.

(f26-3) The function of sending authority proof information received from the authority proof section 25 to the service provider device 30.

(f26-4) The function of receiving service information from the service provider device 30.

Meanwhile, the service provider device 30 has an access control section 31, a challenge creation section 32, an authority verification section 33, and a service management section 34.

The access control section 31 has access control functions (f31a)-(f31c) including communications with the other sections 32-34.

The access control function (f31a) has the following functions (f31a-1)-(f31a-3).

(f31a-1) The function of sending a request to provide required authority information to the service management section 34 on the basis of a service request received from the user device 20.

(f31a-2) The function of sending a challenge creation request to the challenge creation section 32 in response to that service request.

(f31a-3) The function of sending challenge information received from the challenge creation section 32 to the user device 20.

The access control function (f31b) has the following functions (f31b-1)-(f31b-4).

(f31b-1) The function of sending a verification request for authority proof information received from the user device 20 to the authority verification section 33.

(f31b-2) The function of, when the result of the verification indicates validity, authorizing the service management section 34 to provide a service.

(f31b-3) The function of sending service information received from the service management section 34 to the user device 20.

(f31b-4) The function of, when the result of the verification from the authority verification section 33 indicates invalidity, notifying the user device 20 of an error.

The access control function (f31c) has a function of preserving and managing a history of communications with the user device 20 and a function of sending the user's service usage history to the group administration organization device 10 to make a request for user identification.

The challenge creation section 32 has a function of creating challenge information containing unpredictable information in accordance with a challenge creation request received from the access control section 31 and sending the resulting challenge information to the access control section 31.

The authority verification section 33 has a function of, upon receiving challenge and authority proof information from the access control section 31, verifying the validity of the authority proof information and a function of sending the result of the verification to the access control section 31.

The service management section 34 has a function of managing service contents and a function of sending service information to the access control section 31 in response to permission to provide services received from the access control section 31.

Figure 2:
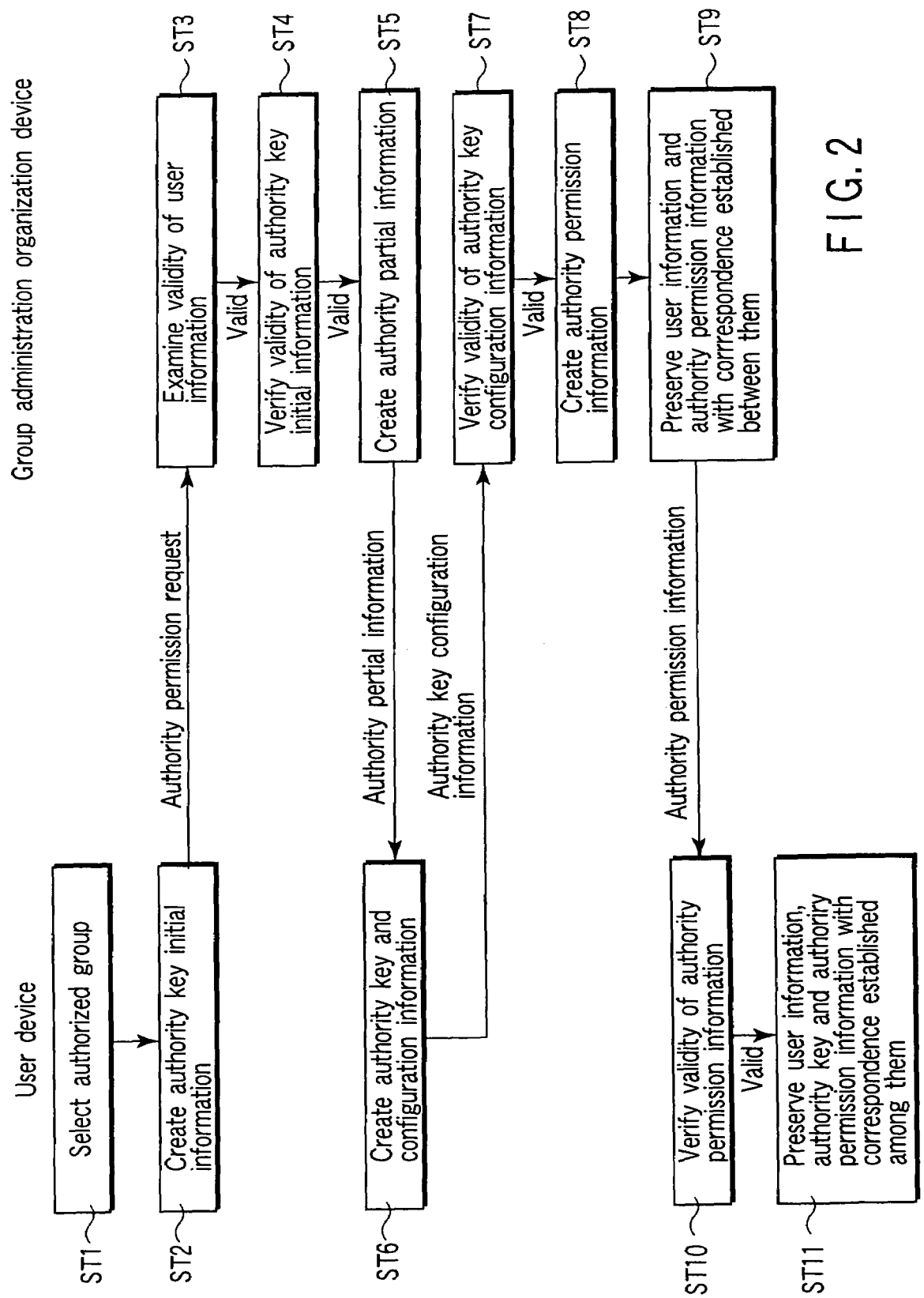
FIG. 2 is a flowchart illustrating the operation of the first embodiment.

Next, the operation of the access control system thus configured will be described using flowcharts of FIGS. 2 and 3. The operation shown in FIGS. 2 and 3 uses the group signature scheme by Camenisch et al in literature 1 with a correspondence established therebetween as shown in Table 2 below.

TABLE 2

Group signature correspondence relationship

| First embodiment (FIGS. 2, 3) | Protocol in literature 1 |
| --- | --- |
| Authority key initial information | C1 |
| Authority partial information | ($\alpha 1, \beta 1$) |
| Authority key configuration information | C2 |
| Authority permission information | (Ai, ei) |
| Authority proof information | (c, s1, s2, s3, s4, T1, T2, T3) |

Note that because the present embodiment uses a group signature scheme as its key technology, it can be implemented using not only a specific group signature scheme as proposed by Camenisch et al but also an arbitrary group signature scheme.

(Preparation)

In the group administration organization device 10, through an operation of the administrator, the information management section 11 determines the definitions of group types and groups, such as valid organizations, and sends a request for group key creation to the group key creation section 13 for each group definition.

The group key creation section 13 creates a group key in response to the group key creation request and sends the resulting group key to the information management section 11.

The information management section 11 manages the group key and the definition of the corresponding group in such a way that they are made to correspond with each other. Thereby, the group becomes enabled to admit users.

(Issue of Authority Permission Information: FIG. 2)

The use device 20, as operated by a user, selects a group administration organization device 10 that administers a group to which he or she wants to gain admission (ST1) and obtains information concerning the group key as well. This information may be obtained at the time of admission to the group or by reading information previously stored in a storage area in the user device 20.

Next, in the user device 20, at the time of admission to the group the authority information management section 21 sends a request for user information to the user information management section 22 and receives user information of the specified user from the user information management section 22.

In addition, the authority information management section 21 sends a request for authority key creation to the authority key creation section 23. Based on the authority key creation request, the authority key creation section 23 creates authority key initial information (ST2) and sends the authority key initial information to the authority information management section 21.

The authority information management section 21 transmits to the selected group administration organization device 10 the user information for which presentation has been requested at the time of admission to the authorized group, the authority key initial information, and a request to issue authority permission information including selected group designation information.

In the group administration organization device 10, the information management section 11, upon receipt of the request to issue authority permission information, sends the user information from the user device 20 and a request for examination to the information examination section 12. Upon receipt of the user information and the request for examination, the information examination section 12 verifies the validity of the user information (ST3), then examines whether or not the user is eligible for admission to the group and sends the examination result to the information management section 11.

The information management section 11, when the examination result indicates ineligibility, notifies the user device 20 to that effect. When the . examination result indicates eligibility, on the other hand, the information management section determines whether or not the authority key initial information has been created as specified (ST4).

When the authority key initial information is not valid as the result of examination in step ST4, an error is presented to the user device 20. When the authority key initial information is valid, on the other hand, authority partial information for authority permission including unpredictable information is created (ST5) and then sent to the user device 20.

In the user device 20, the authority information management section 21 sends the authority partial information and a request for key creation to the authority key creation section 23. Upon receipt of the key creation request, the authority key creation section 23 creates an authority key and authority key configuration information (ST5) and sends the resulting authority key and the authority key configuration information to the authority information management section 21.

The authority information management section 21 sends the authority key configuration information to the group administration organization device 10. Note that cryptological assumptions, such as discrete logarithmic problems, ensure that the authority key itself will not be disclosed to the group administration organization device 10.

In the group administration organization device 10, the information management section 11 verifies the validity of the authority key configuration information (ST7) to determine whether the authority key has been created validly. When the result of the verification in ST7 indicates invalidity, an error is presented to the user device 20; otherwise, the authority key configuration information is sent to the authority permission information creation section 14.

The authority permission information creation section 14 verifies the validity of the authority key configuration information. When the verification result indicates validity, the section 14 creates authorized group designation information and authority permission information in which the user information is embedded by the group signature (ST8) and sends the resulting authority permission information and permission information issue information, such as issue date and issue ID, to the information management section 11.

In the group administration organization device 10, the information management section 11 preserves the user information, the authority permission information, and the issue information, such as issue date and issue ID, in such a way that they are made to correspond with one another (ST9) and sends the authority permission information to the user device 20.

In the user device 20, the authority information management section 21 passes the authority permission information and the authority key received from the authority key creation section 23 to the authority permission information verification section 24 to make a request to verify the validity of the authority permission information.

The authority permission information verification section 24 verifies the validity of the authority permission information (ST10) and sends the verification result to the authority information management section 21.

The authority information management section 21 notifies the group administration organization device 10 of an error when the verification result in step ST10 indicates invalidity. Otherwise, the section 21 preserves the group type, the authority key, and the authority permission information in such a way that they are made to correspond with one another (ST11).

(Authority Proof and Service Provision: FIG. 3)

The user device 20 is operated by the user to select a service that he or she wants to use (ST21). The service requesting section 26 sends a service request including this service designation information to the service provider device 30.

In the service provider device 30, in response to that service request the access control section 31 sends to the service management section 34 a request to provide required authority information. The service management section 34 retrieves the required authority information on the basis of that provision request (ST22) and then sends the resulting authority information to the access control device 31.

Next, the access control device 31 sends a challenge creation request to the challenge creation section 32 in response to the service request. Upon receipt of the challenge creation request, the challenge creation section 32 creates challenge information including unpredictable information (ST23) and sends it to the access control section 31.

Next, the service provider device 30 sends a request to prove the authority information needed to provide the service (hereinafter referred to as a required authority proof request) and the challenge information from the access controller 31 to the user device to make a request to prove that the user is a member of the authorized group. It does not matter how many kinds of required authority exist.

In the user device 20, the service requesting section 26 receives the required authority proof request and the challenge information and sends them to the authority proof section 25.

The authority proof section 25 searches the authority information management section 21 on the basis of the required authority proof request to confirm that all the authority information for which the proof request has been made is held. If no authority information is held, the authority proof section notifies the service provider device 30 to that effect and terminates the communications. The communications may be terminated with no service provider device notification.

When all the authority information is held, the authority proof section 25 creates authority proof information to the effect that the user is a member of the authorized group on the basis of the challenge information from the service provider device 30 and the authority key and the authority permission information from the authority information management section 21 (ST24) and then sends it to the service requesting section 26. The proof information is created on the basis of the requested group type, the corresponding authority key and the authority permission information therefor. The service requesting section 26 sends the authority proof information to the service provider device 30.

In the service provider device 30, the access control section 31 sends the authority proof information and the aforementioned challenge information to the authority verification section 33. Based on the challenge information the authority verification section 33 verifies the validity of the authority proof information (ST25) and sends the verification result to the access control section 31.

When the verification result indicates that all the authority proof is valid, the access control section 31 sends service provision permission to the service management section 34 and then outputs service information received from the service management section 34 by return so as to provide a service corresponding to the authority to the user.

Here, the services have various forms, such as electronic services, physical services, services which support other services, and so on.

The electronic services include a form which, on the basis of authority that a user is a woman by way of example, allows her to browse or use electronic information in sites restricted to women. The service information is electronic information to be browsed or used.

The physical services include a form which, on the basis of authority that a user is a special member by way of example, allows him or her to get goods or to be admitted to restricted spots. The service information is printed information on coupons for goods or control signals to open admission gates.

The services which support other services include a form which, on the basis of authority that a user is over twenty by way of example, allows him or her to purchase alcoholic drinks or cigarettes on automatic vending machines and a form which, on the basis of authority that a user is a student, allows him or her to get discount for students. The service information includes purchase permission signals and student discount permission information.

(User Identification)

Upon receipt of a request from a special organization, such as a police station, a court, or the like, or a request from the service provider device 30, the group administration organization device 10 notifies the administrator of it and causes him or her to examine that request.

As a result of the examination, only when the request is valid, the group administration organization device 10 receives authority proof information as an object from the service provider device 30. The information management section 11 sends the authority proof information, the group key, and a recovery request to the recovery processing section 15.

The recovery processing section 15, upon receipt of the recovery request, identifies the user on the basis of the authority proof information and the group key and then sends recovered information indicating the verification result to the information management section 11. The information management section 11 outputs the recovered information visually and/or in printed form to notify the administrator of it.

As described above, according to the present embodiment, there is no need for the service provider 30 to manage personal information of users because that the user device 20 is a member of an authorized group is proved to the service provider device using the group signature. For this reason, the service provider can be relieved of the burden of managing personal information and personal information unnecessary to prove authority can be protected from the service provider.

Moreover, the present embodiment can be applied to service providing systems having various forms by combining service forms and service accounting forms.

In addition, when the service provider device 30 is a vending machine such as an automatic vending machine or a ticket vending machine, vending is allowed on verification that a user belongs to an authorized group. For this reason, services can be provided to valid users who are adults, students, etc. without disclosing personal information of users. The contents of services to be provided are not limited to articles such as season-tickets, tickets, etc. It goes without saying that they may be authority permission information for allowing the user device 20 to be used as a season-ticket, a ticket, a coupon ticket, or the like.

Furthermore, the service provider device can be utilized not only for vending but also for proof of qualifications by making the user information attribute information such as state qualifications or for identification (for example, to identify part of the address, age, etc.) such as a resident basic register card for registering the address, name, etc.

Furthermore, the group administration organization device 10 and the service provider device 30 need not be separate devices but may be the same device. For example, even if the group administration organization device 10 as an administrative function in a music office and the service provider device 30 as a contents provider are implemented as the same device, the present embodiment will be practiced likewise with the same advantages.

The user device 20 can be implemented in any form, such as a cellular phone, a smart card, a personal computer, or the like. For example, the user device 20 may be configured in such a way that an operation unit and a memory unit are separated from each other and each of the operation unit and the memory unit is removably mounted to a cellular phone. Moreover, the user device 20 may be configured in such a way that an operation program as an operation unit is installed in a cellular phone or personal computer and a memory unit is removably mounted to the cellular phone or personal computer.

As described above, the development of the information industry can be promoted from aspects of users and service providers.

SECOND EMBODIMENT

Figure 4:
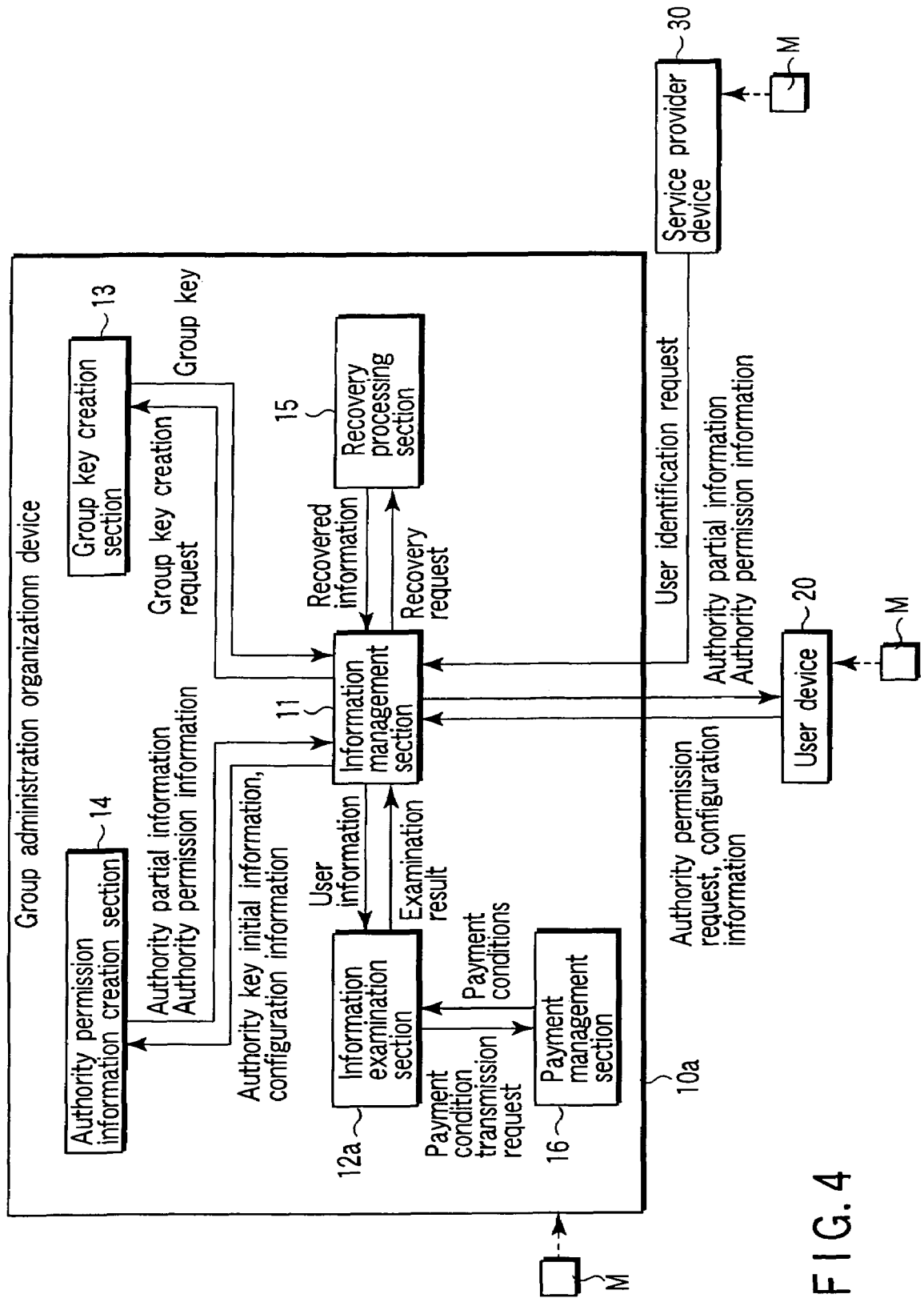
FIG. 4 is a schematic illustration of an access control system according to a second embodiment of the present invention.

FIG. 4 is a schematic illustration of a group administration device applied to an access control system according to a second embodiment of the present invention. Corresponding parts to those in FIG. 1 are denoted by like reference numerals and detailed descriptions thereof are omitted. Here, the different portions will be described mainly. Repeated descriptions are omitted likewise in each of the following embodiments.

That is, this embodiment is a modification of the first embodiment and adapted to provide a prepaid type of service provision. The present embodiment can be applied to a system such that, for example, a user pays his or her subscription for a newspaper for one month to a group administration organization 10a, proves his or her authority to subscribe to the newspaper for one month to the service provider device 30, and receives newspaper delivery service from the service provider.

Specifically, the group administration organization device 10a is provided with a payment management section 16 which manages payment information for charges for received services for each user. An information examination section 12a is provided accordingly with a function of requesting the payment management section 16 to examine the payment conditions of users.

Here, the payment management section 16 has a function of managing payment information for each user and a function of examining a user on the basis of his or her payment conditions in response to a request from the information examination section 12 and sending the examination result to the information examination section 12.

The payment information is information that indicates money depositing conditions, payment conditions such as credit payment or automatic payment from the bank account, and the presence or absence of establishment of payment means. The payment may be made in any of the following forms: account payment, such as transfer to bank account, automatic withdrawal from bank account, etc., cash payment, such as payment at the counter, etc., and electronic payment, such as electronic money, electronic check, etc. Note that, in the case of electronic payment, the payment management section 16 should have a function of verifying the validity of electronic money or the like or confirming the guarantee of payment.

For the examination of users based on payment conditions, various methods are available which include examination of advance payment, examination of spot payment, and examination of guarantee of later payment. For the examination of advance payment, there is a method which confirms advance payment, such as transfer to bank account, sending of postal money order, etc. For the examination of spot payment, there is a method which confirms spot payment, such as cash payment at the counter, sending of electronic money, etc., or validity verification. For the examination of guarantee of later payment, there is a method which confirms that layer payment, such as automatic withdrawal from bank account, credit payment, etc., has been guaranteed.

On the other hand, the information examination section 12a has a function of requesting the payment management section 16 to examine the payment conditions for each user, a function of, in addition to examination of the user information, examining permission including the examination result from the payment management section 16, and a function of sending the overall examination result to the information management section 11.

A contract for charges has been made between the group administration organization device 10 and the service provider device 30 for each service. The system may be put into practice in such a way that both the devices 10 and 30 are owned by the same business, and the counter that manages the user and payment information and the counter that provides services exist independently of each other and are allocated to the group administration organization device 10 and the service provider device 30. Each of these devices need not be one in number.

Next, the operation of the access control system thus configured will be described.

The operation of (Preparation) is the same as in the first embodiment.

(Issue of Authority Permission Information)

Suppose that steps ST1-ST2 were terminated as described previously and the user device 20 has sent user information, authority key initial information, and a request for authority permission information issue to the group administration organization device 10.

In the group administration organization device 10, upon receipt of the authority permission information issue request the information management section 11 sends the user information from the user device 20 and a request for examination to the information examination section 12. The processing up to this point remains unchanged from the previously described processing.

Next, the information examination section 12*a*, upon receiving the user information and the examination request, verifies the validity of the user information (ST3) and makes a request to examine the payment conditions of the user to the payment management section 16.

The payment management section 16, upon receiving the request, examines the user for the payment conditions and sends the examination result to the information examination section 12*a*.

The information examination section 12*a* makes an examination of permission including the examination result by the payment management section 16 in addition to the aforementioned examination of the user information and, only when both the examination results indicate eligibility, sends the overall examination result of being eligible to the information management section 11.

That is, in the present embodiment, an examination of the payment conditions of a user is added at the time of examination of the user prior to admission to a group. The processing in the subsequent steps ST4-ST11 is carried out as in the first embodiment.

The operations of (Authority proof and service provision) and (User identification) remain unchanged from those in the first embodiment.

As described above, in addition to the advantages of the first embodiment, the present embodiment can be expected to provide smooth payment of charges for services provided because the payment conditions of users are examined.

THIRD EMBODIMENT

FIG. 5 is a schematic illustration of an access control system according to a third embodiment of the present invention.

This embodiment is a modification of the first embodiment and adapted to charge provided services on a volume basis through the use of the recovery processing section 15 of the group administration organization device 10 which can identify an user device 20 through valid authority proof information.

Specifically, the system is configured such that the service provider device 30*b* commissions the group administration organization device 10*b* to collect service charges from a user by associating the service usage history (service usage conditions and usage charges) and the authority proof information of the user device 20 with each other.

It is recommended that a contract and method to allow service usage charges to be collected from a user be prepared at the time of issue of authority. For example, it is recommended that the collection of service usage charges be made possible by acquiring information about payment by credit card or automatic money transfer to bank as part of user information and making the payment information the object of an examination of whether to issue authority.

The group administration organization device 10*b* is provided, in addition to the aforementioned sections 12-14, with an information management section 11*b* and a recovery processing section 15*b*, which are provided in place of the aforementioned information management section 11 and recovery processing section 15, and an accounting section 17 and an authority examination section 18 which are newly added in this embodiment.

Here, the information management section 11*b* has not only the aforementioned functions of the information management section 11 but also a function of sending the user information, the authority permission information and the issue information to the accounting section 17 as requested by the accounting section 17.

The recovery processing section 15*b* has a function of receiving group key information required to recover user identification information from the information management section 11*b* and managing the group key information and a function of restoring user information in accordance with authority proof information and a recovery request received from the accounting section 17 and sending the resulting user information to the accounting section 17.

The accounting section 17 has the following functions (f17-1)-(f17-5):

(f17-1) The function of managing group user information, permission information and issue information therefor received from the information management section 11*b* and usage charge information for the user device 20 in such a way as to associate them with one another.

(f17-2) The function of, upon receipt of authority proof information, usage history information, and an accounting request from the service provider device 30*b*, sending the authority proof information and a verification request to the authority examination section 18.

(f17-3) The function of, when the verification result indicates invalidity, notifying the service provider device 30 of a verification error.

(f17-4) The function of, when the verification result indicates validity, sending authority proof information a recovery request to the recovery processing section 15*b*.

(f17-5) The function of managing usage charge information in usage history information for which a user has been identified from the recovery information received from the recovery processing section 15*b* for each user information.

Here, the user history information contains usage information about at least the dates and types of services provided and usage charge information.

The accounting section 17 need not be provided within the group administration organization device 10*b* but may be provided outside it.

The authority examination section 18 has a function of verifying the validity of the authority proof information received from the accounting section 18 and sending the verification result to the accounting section 18.

The service provider device 30*b* has, in addition to the aforementioned sections 32-34, an access control section 31*b* in place of the access control section 31 and is newly added with a usage management section 35.

The access control section 31*b* has, in addition to the aforementioned functions of the access control section 31, a function of sending authority proof information and usage history information for the user device 20 to the usage management section 35.

The usage management section 35 has the following functions (f35-1)-(f35-3):

(f35-1) The function of managing authority proof information and usage history information received from the access control section 31*b* in such a way as to associate them with each other.

(f35-2) The function of sending user's authority proof information, usage history information and an accounting request to the group administration organization device 10b at regular intervals.
(f35-3) The function of managing verification errors for authority proof information from the group administration organization device 10b.

Next, the operation of the access control system thus configured will be described.

The operation of (Preparation) remains unchanged from that in the first embodiment.

(Issue of Authority Permission Information)

The operation through step ST3 to examine the user information is performed as in the first embodiment. That is, upon receipt of user information and a request for examination, the information examination section 12 verifies the validity of the user information (ST3), then examines whether or not the user is eligible for admission to the group and sends the examination result to the information management section 11b.

Next, the information management section 11b, when the examination result indicates ineligibility, notifies the user device 20 to that effect. The operation up to this point is the same as in the first embodiment.

When the result of the examination by the information examination section 12 indicates eligibility, on the other hand, the information management section 11b sends the user information and a request to confirm the contract to the accounting section 17 unlike the above case.

In response to the contract conformation request, the accounting section 17 confirms that a volume-based accounting contract corresponding to the user information has been made and sends the confirmation result to the information management section 11b. Here, that a volume-based accounting contract has been made means, for example, that a credit settlement of a credit sales company has been confirmed or that the bank account from which automatic withdrawal of money is made has been confirmed.

In the information management section 11b, the aforementioned processing in steps ST4 through ST11 are carried out as in the first embodiment when the result of confirmation by the accounting section 17 indicates that the contract has already been made. In step ST9, however, the information management section 11b retains the user payment information as well as the aforementioned user information, authority permission information, and issue information, such as the date of issue and the issue number, in such a way as to associate them with one another.

(Authority Proof and Service Provision)

The operations of the authority proof and the service provision are the same as those in the first embodiment.

However, the service provider device 30b manages the authority proof information and the usage history information for the user device 20 in such a way as to associate them with each other in the usage management section 35. And the service provider device commissions the group administration organization device 10b to collect usage charges at regular intervals and, at the time of commission, sends the authority proof information, the usage history information and an accounting request to the group administration organization device 10. As for the usage history information, it is not necessary to send all the usage conditions, such as times and types of services. For volume-based accounting, usage history information that specifies usage charges is simply sent to the group administration organization device 1ob.

Figure 6:
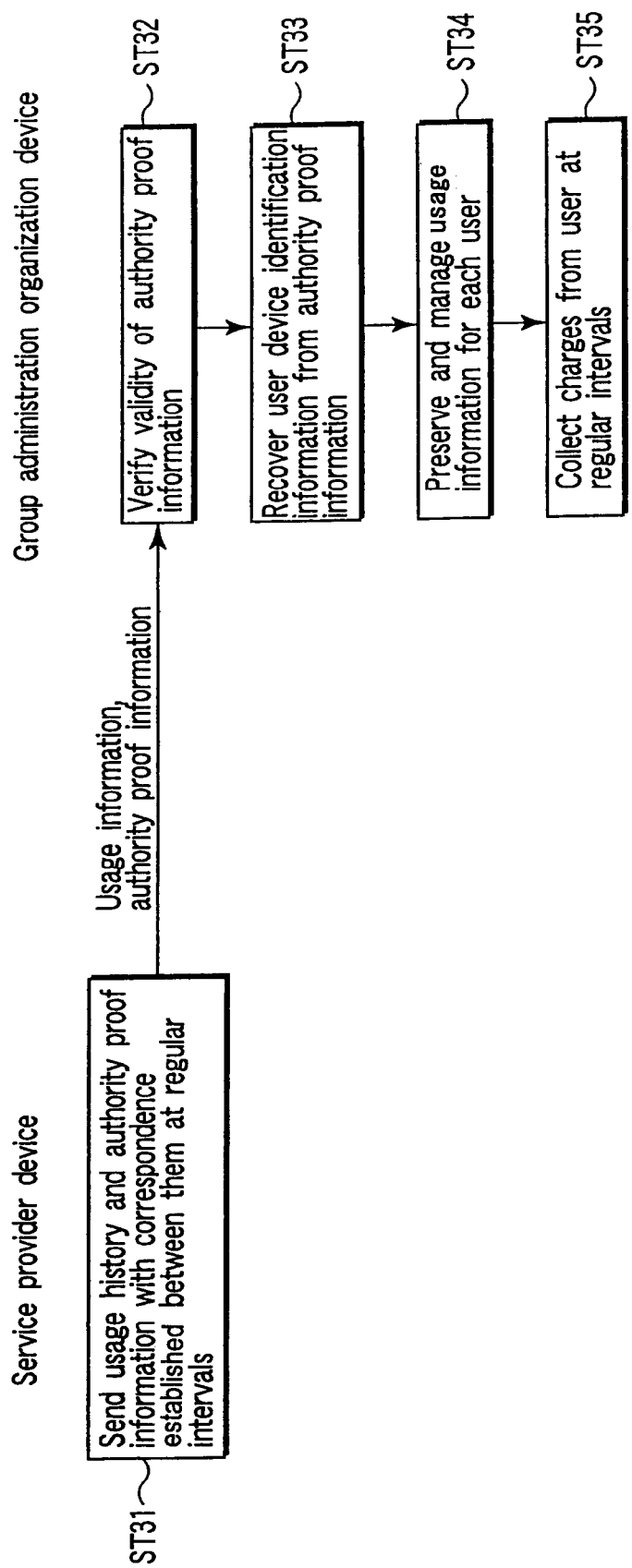
FIG. 6 is a flowchart illustrating the operation of the third embodiment.

Subsequently, the usage charge collection operation at regular intervals will be described using a flowchart of FIG. 6.

(Usage Charge Collection: FIG. 6)

The service provider device 30b sends authority proof information, usage history information and an accounting request to the group administration organization device 10b for each user at regular intervals (ST31). With the usage history information, as described above, not all the usage conditions are sent but the contents that specify usage charges needed for volume-based accounting are sent in view of the privacy of the user device 20 and the system operation policy.

In the group administration organization device 10b, upon receipt of the authority proof information, the usage history information and the accounting request the accounting section 17 sends the authority proof information and a request for verification to the authority examination section 18. The authority examination section 18 verifies the validity of the authority proof information (ST32) and sends the verification result to the accounting section 17. If, as the result of verification, the authority proof information is not valid, a verification error is presented to the service provider device 30b.

If, on the other hand, the result of verification is that the authority proof information is valid, then the accounting section 17 sends the authority proof information and a request for recovery to the recovery processing section 15b. The recovery processing section 15b recovers information for identifying the user on the basis of the group key information and the authority proof information (ST33). Based on the recovered information, the accounting section 17 identifies the user information.

The group administration organization device 10b repeats steps ST32 and ST33 and preserves and manages usage specification information which represents usage history information that specifies usage charges in the form of a bill for each user device 20 (ST34).

After the termination of step ST34, the group administration organization device 10b notifies the user device 20 of usage specification information by electronic mail by way of example and collects the usage charges from the user at regular intervals on the basis of the method of payment agreed at the time of issue of authority (ST35). The method of notifying the user device 20 is not limited to electronic mail. Various means are available, such as sending of specifications by post, FAX, electronic specification browsing service with access restricted for each user device 20, etc.

The group administration organization device 10b may pay service charges based on usage specification information to the service provider device 30b before or after the termination of step ST35 or may pay a fixed amount by the month to the service provider device 30b.

For service volume-based accounting for the user device 20, usage charges can be collected in various units such as of the usage time, the access count, contents, etc.

As described above, the present embodiment can provide volume-based accounting in addition to the advantages of the first embodiment.

Like the first embodiment, the third embodiment can also accommodate a request to identify a user made by a third-party organization, such as a police station, a court, etc., or the service provider device 30.

FOURTH EMBODIMENT

Figure 7:
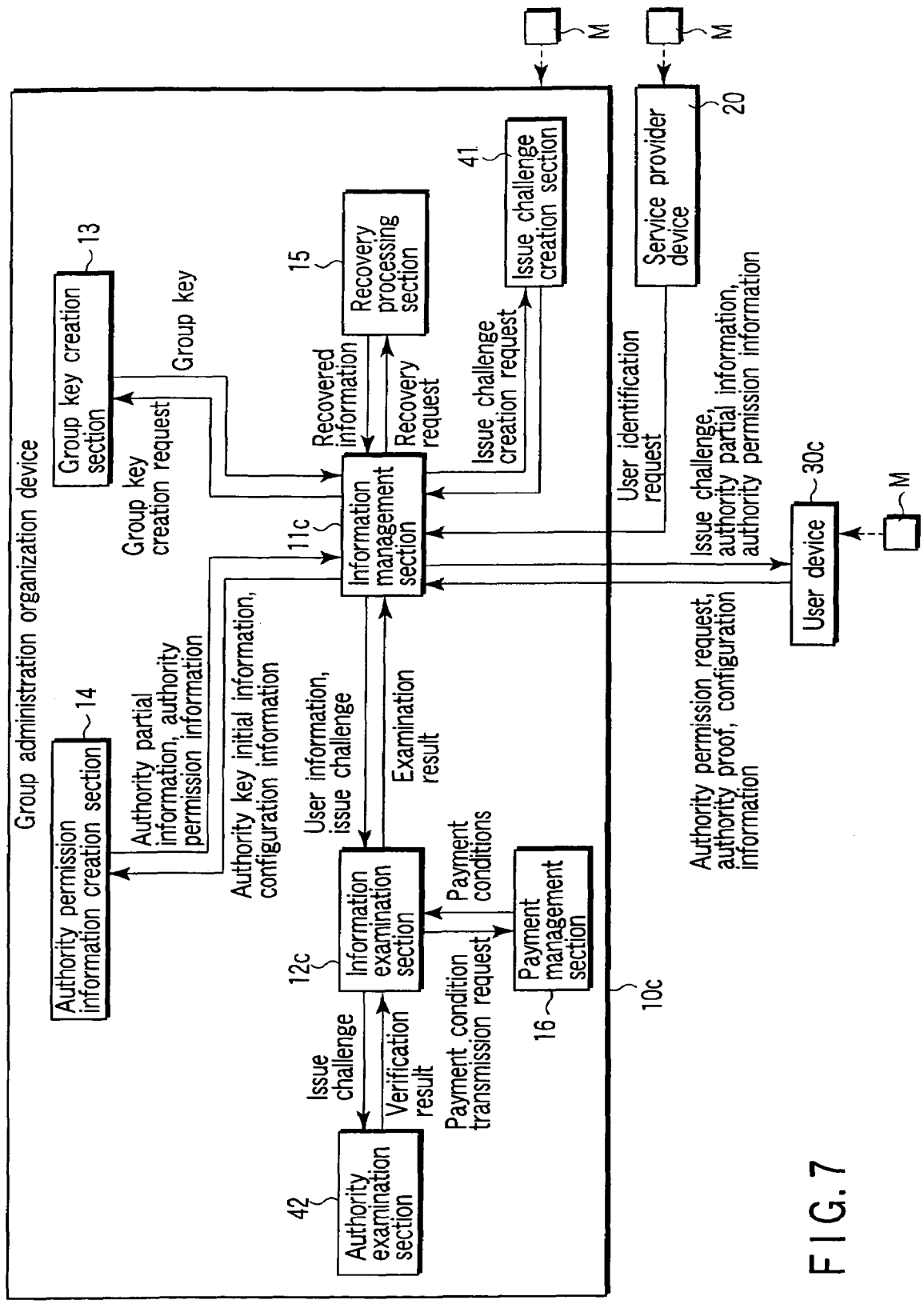
FIG. 7 is a schematic illustration of an access control system according to a fourth embodiment of the present invention.

FIG. 7 is a schematic illustration of an access control system according to a fourth embodiment of the present invention.

This embodiment is a modification of the second embodiment which, of the modifications of the first to third embodiments, is described as a typical example and, when a user wants to be a member of a certain group, requires the proof of authority for another group into which he or she has been admitted.

Specifically, the user device 20 has, in addition to the aforementioned functions, a function of, when a user wants to be a member of a certain group, sending authority proof information that proves the authority of another group to the group administration organization device 10c as requested by the group administration organization device 10c. In other words, at the time of issue of a certain authority, the user device 20 proves another authority to the group administration organization device 10c.

Meanwhile, the group administration organization device 10b is provided, in addition to the aforementioned sections 13-16, with an issue challenge creation section 41 and an authority examination section 42 and accordingly have the aforementioned sections 11 and 12 replaced with an information management section 11c and an information examination section 12c.

Here, the information management section 11c has, in addition to the aforementioned functions of the information management section 11, the following functions (f11c-1)-(f11c-3):

(f11c-1) The function of sending a request for issue challenge creation for authority proof to the issue challenge creation section 41.

(f11c-2) The function of, upon receipt of issue challenge information from the issue challenge creation section 41, sending the issue challenge information to the user device 20 to make a request for authority proof information necessary for issue of authority as an object of issue.

(f11c-3) The function of sending the authority proof information from the user device 20 and the issue challenge information from the issue challenge creation section 41 to the information examination section 12c.

The information examination section 12c has, in addition to the aforementioned functions of the information examination section 12a, the following functions (f12c-1) and (f12c-2):

(f12c-1) The function of sending the issue challenge information and the authority proof information received from the information management section 11c to the authority examination section 42 to make a request for validity verification.

(f12c-2) The function of, upon receipt of the verification result from the authority examination section 42, making overall permission examination including the verification result and sending the examination result to the information management section 11c.

The issue challenge creation section 41 has a function of, in response to the issue challenge creation request from the information management section 11c, creating issue challenge information including unpredictable information and sending the resulting issue challenge information to the information management section 11c.

The authority examination section 42 has a function of making an examination to verify the validity of the issue challenge information and the authority proof information from the information examination section 12c, a function of managing group key information of a group necessary for the verification, and a function of sending the examination result to the information examination section 12c.

Next, the operation of the access control system thus configured will be described.

The operation of (Preparation) remains unchanged from that in the second embodiment.

(Issue of Authority Permission Information)

Suppose that steps ST1-ST2 were terminated as described previously and the user device 20c has sent user information, authority key initial information, and a request for authority permission information issue to the group administration organization device 10c.

In the group administration organization device 10c, upon receipt of the authority permission information issue request the information management section 11c sends a request for issue challenge creation for authority proof to the issue challenge creation section 42. Upon receipt of the issue challenge information from the issue challenge creation section 42, to make a request for other group's authority proof information necessary for issue of authority which is an object of issue the information management section 11c sends the corresponding other group information and the issue challenge information to the user device 20.

The user device 20c proves the ownership of the authority requested in the same way as when authority is proved to the service provider device 30 on the basis of the received group information and issue challenge information and sends the resulting authority proof information to the group administration organization device 10c.

In the group administration organization device 10c, the information management section 11c sends the authority proof information, the user information, the issue challenge information, and a request for examination to the information examination section 12c.

Upon receipt of the authority proof information, the user information, the issue challenge information, and the request for examination, the information examination section 12c verifies the validity of the user information (ST3), requests the payment management section 16 to examine the payment conditions of the user, and sends the issue challenge information and the authority proof information to the authority examination section 42 to make a request for validity verification.

The payment management section 16, upon receipt of the request, examines the user for payment conditions and sends the examination result to the information examination section 12c.

Upon receipt of the issue challenge information and the authority proof information, the authority examination section 42 makes an examination to verify the validity of the authority proof information using the issue challenge information on the basis of the group key information of the group needed for verification and managed in advance and sends the examination result to the information examination section 12c.

The information examination section 12c makes an examination of permission including the examination result from the authority examination section 42 in addition to the aforementioned user information examination result and the examination result from the payment management section 16. Only when all the examination results indicate eligibility, does the information examination section send the overall examination result indicating eligibility to the information management section 11c.

That is, the present embodiment is added, at the time of examination of a user prior to admission to a group, with an examination of authority proof in another group to which the user belongs. The subsequent steps ST4 through ST11 are carried out as in the second embodiment.

If the result of the overall examination by the information examination section 12c indicates ineligibility, the examination result which indicates ineligibility is sent to the information management section 11c, which in turn transmits an error to the user device 20, whereby the processing is terminated. Instead of transmitting an error a person in charge at the counter may notify the user of an error by word of mouth, telephone, or FAX.

The operations of (Authority proof and service provision) and (User identification) remain unchanged from those in the second embodiment.

As described above, in addition to the advantages of the second embodiment, the present embodiment can make proof of authority even if, when a user becomes a member of a group, proof of authority in another group which he or she has already joined is required.

Although the present embodiment has been described as requesting authority proof information for another group to the user device 20$c$, this is not restrictive. Requesting authority proof information to the user device 20$c$ can be omitted provided that the group administration organization device 10$c$ that issues authority permission information for a new group which a user wants to join and a device that manages authority proof information for another group necessary for issuing the authority proof information for the new group are the same device or devices that are capable of confirming the validity of authority proof information through mutual communications.

Moreover, although the present embodiment has been described as a modification of the second embodiment, this is not restrictive. Even as a modification of the first or third embodiment, the present embodiment which, at the time of examination of a user for admission to a certain group, confirms authority for the other group can be practiced likewise with the same advantages.

FIFTH EMBODIMENT

Next, an access control system according to a fifth embodiment of the present invention will be described.

This embodiment shows a group definition method that diversifies service access control and can be applied to any of the first through fourth embodiments.

As the definition of groups, classes of accessible services are specified.

The classes are ones into which services that one service provider device 30 provides are classified and allocated to the groups. For example, as shown in FIG. 8, the services are classified into three classes CL1-CL3 (ranks or types). Users who belong to the group G1 are allowed to access a service of the class CL1. Users in the group G2 are allowed to access services of the classes CL1 and CL2. Users in the group G3 are allowed to access services of all the classes CL1, CL2 and CL3. Entities which do not belong to any of the groups G1-G3 are not allowed to access any of the services of the classes CL1-CL3.

The present embodiment may be practiced in combination with the establishment of other authority such that, for example, if the user device 20 in any of the groups G1-G3 establishes authority different from the groups G1-G3, the services of all the classes CL1-CL3 are made available to that user device. In any case, the groups G1-G3 can be varied in the way of accounting according to the level of their respective authority.

In the present embodiment, the group administration organization device 10 need not be one in number.

As described above, according to the present embodiment, in addition to the advantages of that embodiment of the first through fourth embodiments to which the present embodiment is applied, services can be provided for each class by defining groups for each of the classes of the services.

SIXTH EMBODIMENT

Next, an access control system according to a sixth embodiment of the present invention will be described. This embodiment shows a group definition method that diversifies service access control and can be applied to any of the first through fifth embodiments.

As the definition of groups, aggregate domain of the accessible service provider device 30 is specified.

The domain represents a collection of two or more accessible service provider devices 30. For example, suppose that five service provider devices 30A-30E are present as shown in FIG. 9. Here, suppose that the domain #1 is a collection of three devices 30A-30C. Suppose that the domain #2 is a collection of two devices 30D and 30E. In this case, dividing the groups into a group X that is allowed to access the domain #1 only, a group Y that is allowed to access the domain #2 only, and a group Z that is allowed to access both the domains #1 and #2 allows the user device 20 to perform domain access control on the service provider devices 30A-30E.

The aforementioned class and domain may be combined and each of them may be made one group. For example, when there are three classes CL1-CL3 and two domains #1 and #2, group authority proof for classes and group authority proof for domains may be made. Furthermore, six groups may be defined newly by forming each of six combinations each of one of the classes CL1-CL3 and one of the domains #1 and #2 into a group.

Alternatively, it is also possible to combine groups for classes and groups for domains. For example, nine groups may be defined newly by forming each of nine combinations each of one of the groups G1-G3 for classes and one of the groups X, Y and Z for domains into a group. These newly defined groups can be varied in the way of accounting according to the level of their respective authority.

In the present embodiment, the group administration organization device 10 need not be one in number.

As described above, according to the present embodiment, in addition to the advantages of that embodiment of the first through fifth embodiments to which the present embodiment is applied, services can be provided for each domain by defining a group for each of the domains consisting of a collection of the service provider devices 30A-30E.

The techniques described in the aforementioned embodiments can be distributed in the form of computer-executable programs stored in storage media, such as magnetic disks (floppy (registered trade mark) disks, hard disks, etc.), optical disks (CD-ROMs, DVDs, etc.), magneto-optical disks (MO), semiconductor memories, etc.

It does not matter whatever storage form storage media have as long as they can store programs and can be read by computers.

An OS (operating system) or MW (middleware), such as database management software, network software, etc., which is running on a computer may carry out part of the processes that implement the present embodiment as instructed by a program installed from a storage medium into the computer.

The storage media in the present invention include not only media independent of computers but also storage media stored or temporarily stored with programs downloaded via a LAN or the Internet.

The storage medium is not limited to one. The storage medium in the present invention includes a case where the processing in the present embodiment is carried out through two or more media. It does not matter whatever configuration the medium has.

The computer in the present invention, which carries out each process in the present embodiment on the basis of a program stored on a storage medium, may take any form: a standalone device, such as a personal computer; a system in which two or more devices are networked; or the like.

The computer in the present invention is not limited to a personal computer but may comprise an operations unit or a microcomputer incorporated in information processing equipment. It is a generic term for equipment and devices that can perform the functions of the present invention with programs.

The present invention is not limited to the above embodiments and can be modified variously at the stage of practice thereof without departing from the scope thereof. In addition, the embodiments may be practiced in combination as properly as possible, in which case the combined advantages will be obtained. Moreover, each of the embodiments includes inventions at various stages and disclosed constituent elements can be combined properly to extract various inventions. For example, if an invention is extracted by omitting some elements from all the constituent elements shown in an embodiment, the omitted portions will be compensated for properly with common techniques in practicing the extracted invention.

The present invention can be practiced and embodied in still other ways without departing from the scope thereof.

What is claimed is:

1. An access control system which controls access on the basis of a group signature scheme, comprising:

a group administration organization device which, at a users request, admits a user device to an authorized group, creates authority permission information using the group signature scheme, and sends the authority permission information to the user device;

the user device which retains the authority permission information received from the group administration organization device as a result of the user's request, creates authority proof information using the group signature scheme from the authority permission information and sends the authority proof information; and a service provider device which, when accessed by the user device, requests the authority proof information of the user device, verifies the authority proof information received from the user device through the group signature scheme and, when a verification result indicates validity, provides a corresponding service, wherein the group signature scheme is for proving that a user belongs to the authorized group without identifying the user, the authority proof information is a group signature in the group signature scheme, and the group signature is created by an individual user, the user device transmits a service request to the service provider device to receive service provision, the service provider device includes, required authority retrieval means which retrieves required authority information based on the service request received from the user device, challenge creation means which creates challenge information including unpredictable information based on the service request received from the user device, proof request means which transmits a recquired authority proof request to request proof of the required authority information retrieved by the required authority retrieval means and the challenge information created by the challenge creation means to the user device, proof information verification means which verifies the authority proof information based on the challenge information upon receipt of the authority proof information from the user device in response to transmission by the proof request means, service information output means which outputs service information so as to provide the service when a verification result by the proof information verification means indicates validity, and usage management means which manages the authority proof information which has been verified to be valid by the proof information verification means and usage history information corresponding to the authority proof information in such a way that they are associated with each other and transmits the authority proof information, the usage history information, and an accounting request to the group administration organization device at regular intervals, and the group administration organization device includes, accounting request verification means which verifies the authority proof information upon receipt of the authority proof information, the usage history information, and the accounting request from the service provider device, and accounting means which identifies the user from the authority proof information based on the group signature scheme when a verification result by the accounting request verification means indicates validity and manages user information corresponding to an identification result and usage charge information in the usage history information in such a way that they are associated with each other.

2. A service provider device which, upon receipt of a service request from a user device, verifies whether the user device belongs to an authorized group, on the basis of a group signature scheme and, when a verification result indicates validity, provides a service, comprising:

required authority retrieval means which retrieves required authority information on the basis of the service request received from the user device;

challenge creation means which creates challenge information including unpredictable information on the basis of the service request received from the user device;

proof request means which transmits a required authority proof request to request proof of the authority information retrieved by the required authority retrieval means and the challenge information created by the challenge creation means to the user device;

proof information verification means which, upon receipt of authority proof information from the user device in response to transmission by the proof request means, verifies the authority proof information on the basis of the challenge information;

service information output means which, when the verification result by the proof information verification means indicates validity, outputs service information so as to provide the service; and usage management means which manages the authority proof information which has been verified to be valid by the proof information verification means and usage history information corresponding to the authority proof information in such a way that they are associated with each other and transmits the authority proof information, the usage history information, and an accounting request to a group administration organization device at regular intervals, wherein the group signature scheme is for proving that the user device belongs to an authorized group without identifying a user, the authority proof information is a group signature in the group signature scheme, and the group signature is created by an individual user, and the group administration organization device, upon receipt of the authority proof information, the usage history information, and the accounting request from the service provider device, verifies the authority proof information and when a verification result indicates validity, identifies the user from the authority proof information based on the group signature scheme and manages user information corresponding to the identification result and usage charge information in the usage history information in such a way that they are associated with each other.

3. A computer program stored on a computer-readable storage medium for use with a service provider device which, upon receipt of a service request from a user device, verifies whether the user device belongs to an authorized group, on the basis of a group signature scheme and, when verification result indicates validity, provides a service, comprising:

a first program code which causes computer to carry out required authority retrieval processing which retrieves required authority information on the basis of the service request received from the user device;

a second program code which causes the computer to carry out challenge creation processing which creates challenge information including unpredictable information on the basis of the service request received from the user device;

a third program code which causes the computer to carry out proof request processing which transmits a required authority proof request to request proof of the authority information retrieved by the required authority retrieval processing and the challenge information created by the challenge creation processing to the user device;

a fourth program code which causes the computer to carry out proof information verification processing which, upon receipt of authority proof information from the user device in response to transmission by the proof request processing, verifies the authority proof information on the basis of the challenge information;

a fifth program code which causes the computer to carry out service information output processing which, when the verification result by the proof information verification processing indicates validity, outputs service information so as to provide the service;

a sixth program code which causes the computer to carry out usage management processing which manages the authority proof information which has been verified to be valid by the proof information verification processing and usage history information corresponding to the authority proof information in such a way that they are associated with each other and transmits the authority proof information, the usage history information, and an accounting request to a group administration organization device at regular intervals, wherein the group signature scheme is for proving that the user device belongs to an authorized group without identifying a user, the authority proof information is a group signature in the group signature scheme, and the group signature is created by an individual user, and the group administration organization device, upon receipt of the authority proof information, the usage history information, and the accounting request from the service provider device, verifies the authority proof information and when a verification result indicates validity, identifies a user from the authority proof information on the basis of the group signature scheme and manages user information corresponding to an identification result and usage charge information in the usage history information in such a way that they are associated with each other.

* * * * *